UNITED STATES PATENT OFFICE 2,623,864

POLYMERIZATION OF ALLYLIC ETHERS

Arthur N. Wrigley and Elias Yanovsky, Philadelphia, and Peter L. Nichols, Jr., Oreland, Pa., assignors to the United States of America as represented by the Secretary of Agriculture No Drawing. Application July 29, 1949, Serial No. 107,624

8 Claims. (Cl. 260—17.4)

(Granted under the act of March 3, 1883, as amended April 30, 1928; 370 O. G. 757)

This application is a continuation in part of March 3, 1883, as amended by the act of April 30, 1928, and the invention herein described, if patented in any country, may be manufactured and used by or for the Government of the United States of America for governmental purposes throughout the world without the payment to us of any royalty thereon.

This application is a continuation in part of our copending abandoned application Serial No. 648,550 filed February 18, 1946.

This invention relates to polymeric products derived from organic solvent soluble allylic ethers and has among its objects the provision of such polymers and processes for their preparation. Polymerizable organic solvent soluble allylic ethers of aliphatic polyhydric compounds include:

1. Solid allylic ethers of polymeric polyhydroxy compounds such as starch, and
2. Liquid allylic ethers of monomeric polyhydroxy compounds like glycols, glycerol, mannitol, sucrose, etc.

These solid and liquid allylic ethers possess the valuable property of being modified on contact with air (or oxygen) and converted, slowly at ordinary temperature and more rapidly on heating, to insoluble, infusible solid products which are highly resistant to the action of heat, solvents and other reagents. This process, which in the case of the solid ethers results in an insolubilization, and in the case of the liquid ethers causes solidification as well as insolubilization, will hereinafter be referred to as "polymerization," regardless of the agents used to induce it or to the probable mechanism of the reactions involved.

Polymerization of allylic ethers on contact with free oxygen, is promoted by application of heat, ultra-violet or infra-red radiations and the presence of conventional paint driers. However, only films or thin coatings can thus be polymerized and completion of the process usually requires a considerable length of time.

When such polymerization procedures are applied to the treatment of a thick layer, or a relatively large body of the ether, polymerization occurs only on the surface thereof, while the inner portion, out of contact with atmospheric oxygen, remains essentially unchanged, irrespective of the temperature and duration of the process. Attempts to overcome this difficulty by incorporating into the ether an oxygen-yielding substance were unsuccessful. It was then found that the solid, polymerizable ethers such as allyl starch can be uniformly polymerized by heating in the mold with sulfur and rubber compounding ingredients. This process described in Patent No. 2,449,816 to Nichols and Hamilton, has the following limitations.

1. The products are opaque due to the use of free sulfur and other ingredients.
2. Liquid ethers are not well adapted for use since they cannot be satisfactorily compounded.
3. It is impracticable to use the method for the production of coatings.

We have found that allylic ethers react with a sulfur chloride, such as sulfur monochloride or sulfur dichloride, to form polymeric products. We have also found that the degree of polymerization thus attained can be controlled within wide limits by varying the sulfur chloride-allylic ether ratio utilized in the process. We have further found that organic solvent soluble, polymerizable allylic ethers of aliphatic polyhydric compounds can thus be rapidly and uniformly polymerized, either in bulk or in the form of thin layers, and converted into infusible and insoluble products.

Polymerization of the allylic ethers by the method of our invention is induced by contact with the sulfur chloride and can be effected by mixing the reactants, as such or in the presence of an inert solvent or diluent. Films, coatings and other thin layers of the allylic ethers can also be polymerized by exposure to vapors of sulfur chloride.

The reaction between allylic ethers and the sulfur monochloride or sulfur dichloride is a violent one, but can be moderated by proper regulation of the concentration of the reacting substances. Although polymerization products can be obtained at elevated temperature, for instance at about 100° C., low temperature favors better control of the reaction and purity of the resulting products in that degradation of the glycosidic linkages of those ethers which contain them is avoided. We prefer therefore, to conduct bulk polymerization of allylic ethers at temperatures below 40° C., and preferably within the range of about 0° to 25° C. in reactions involving ethers containing glycosidic linkages. At temperatures substantially below 0° C. the reaction rate is greatly decreased.

The polymerization method of this invention is applicable to solvent soluble allyl and substituted-allyl ethers, such as allyl, methallyl, crotyl, cinnamyl, chloroallyl or bromoallyl ethers, and in general to organic solvent soluble allylic ethers containing more than one allylic ether group, that is an oxygen bonded carbon-chain radical of an monounsaturated beta-gamma olefinic alcohol, having the general formula:

$$CHR=CR_1-CH_2-$$

wherein R and $A_1$ may be hydrogen, halogen or hydrocarbon radicals such as phenyl or a lower alkyl. Most valuable products are obtained on polymerization of liquid allylic polyethers of aliphatic polyhydroxy compounds containing from two to eight hydroxyl groups, like ethylene glycol and other glycols; glycerol, pentaerythritol, mannitol and other hexitols, sucrose etc.; and of solid allylic polyethers of oligosaccharides and polysaccharides, containing at least 1.3 allylic groups per hexose unit and adapted to form, at ordinary temperature, solutions in organic solvents, like acetone, alcohols, benzene, toluene, or xylene, of at least about 40 percent concentration, such as allylic polyethers of starch. In view of their ready availability and the superior products had therewith, we prefer to use in our process those ethers in which the allylic group are allyl or 2-methyl allyl group, such as the allylic ethers described in Journal of American Chemistry Society, 66, 1625–1627 (1944); 67, 46–49; 2037–2039 (1945); 68, 2020–2022 (1946).

In the bulk polymerization of allylic ethers we prefer to use the sulfur chloride and the ether in the molar ratio of at least 1 to 2. By varying the sulfur chloride-allylic ether ratio the bulk polymerization process makes possible to control the extent of polymerization of the resulting products, and to obtain various polymeric materials useful as components and intermediate in the production of plasticizers and modifying agents, adhesives, synthetic resins, and similar constituents of plastic and coating compositions.

The following examples illustrate the invention.

EXAMPLE I

Ten grams of diallyl ether were placed into a flask provided with a dropping funnel, mechanical stirrer and a chlorcalcium tube. 6.88 grams of sulfur monochloride (an amount sufficient to react with one allyl group per each molecule of the allyl ether) was added through the dropping funnel with agitation and while maintaining the temperature of the reaction mixture at 25° C. by means of external cooling. When the exothermic reaction had subsided, the contents of the flask were held at room temperature for twenty hours. The almost colorless, mobile liquid thus obtained was soluble in benzene, carbon disulfide, acetone, ethyl ether, ethyl acetate, chloroform and dioxane. A similar product was obtained by combining the reactants at 0° C. and maintaining at zero degrees for 7 hours.

EXAMPLE II

Ten grams of diallyl ether treated at 0° C. with 12.39 grams of sulfur monochloride (enough for 1.8 allyl groups), as described in the foregoing example gave an extremely viscous, clear yellow product, soluble in most organic solvents other than alcohol, ether or aliphatic hydrocarbons.

EXAMPLE III

Ten grams of diallyl ether were reacted at 25° C. with 13.8 grams sulfur monochloride (enough for two allyl groups) as described in Example I. After five hours the reaction mixture was converted to a product having molasses-like consistency, and on standing for an additional seventy-two hours at room temperature, a pale yellow, semi-solid material was formed which was soluble in benzene, carbon disulfide, ethyl acetate, chloroform and dioxane; partly soluble in acetone; and insoluble in water, ethanol, ether, allyl mannitol and paraffinic hydrocarbon solvents. When this product was heated in triethylene tetramine at 100° C. for one hour, it was converted to a benzene insoluble material.

EXAMPLE IV

Twenty grams of diallyl ethylene glycol were reacted with nineteen grams of sulfur monochloride (enough for two allyl groups) at 25° C. as described in the foregoing examples. The sulfur monochloride was added in two equal increments at two hour intervals. The exothermic reaction was completed within five hours after which time the viscosity of the reaction mixture ceased to increase to any appreciable degree. The mixture was then allowed to stand overnight at room temperature. The viscous product thus obtained was soluble in toluene and one part of a 26% solution in this solvent when blended with four parts by volume of a 26% solution of allyl starch in toluene, formed a clear, homogeneous mixture; films deposited from this mixture on wood panels were clear and showed good compatibility. A similar yellowish, sirupy product was obtained on adding 9.5 grams of sulfur monochloride to 10 grams of diallyl ethylene glycol over a period of 7 minutes, with agitation and while maintaining the temperature at 25° C., stirring the mixture for an additional 4½ hours and then allowing it to stand at room temperature for 24 hours.

The products obtained by either of the above-described procedures showed the same solubility in organic solvents as that displayed by the product of Example III, and were similarly rendered insoluble in benzene by heating with triethylene tetramine.

EXAMPLE V

Ten grams of triallyl glycerol were stirred with 3.18 grams of sulfur monochloride (enough for one allyl group) which was added all at once while maintaining the temperature at 25° C. The reaction was completed after twenty-two hours. The product was a colorless, limped liquid, soluble in benzene, carbon disulfide, acetone, dioxane, ether, ethyl acetate, chloroform and allyl mannitol; partly soluble in ethanol and in paraffinic hydrocarbon solvents. Its molecular weight by cryoscopy in benzene was 457 or 1.6 times that expected from the stoichiometry of the reaction.

EXAMPLE VI

Ten grams of triallyl glycerol were reacted with 5.3 grams of sulfur monochloride (enough for 1.5 allyl groups) as described in the foregoing example. The resulting product was a thick, sirupy material insoluble in ethanol, paraffinic hydrocarbons and glacial acetic acid, but soluble in the other solvents listed in Example V.

EXAMPLE VII

Ten grams of triallyl glycerol were reacted with 5.56 grams of sulfur monochloride (enough for 1.75 allyl groups) as described in Example V. The very viscous product so obtained was soluble in many of the common organic solvents. Films prepared from solutions obtained by blending a 30% solution of this material in toluene with 4 parts of 30% toluene solution of allyl starch showed complete compatibility.

EXAMPLE VIII

Ten grams of triallyl glycerol were reacted with 6.36 grams of sulfur monochloride (enough for 2 allyl groups) which was added over a period of 5 minutes, while stirring and maintaining the temperature at 25° C. Within 2¼ hours the reaction mixture was converted into an almost colorless crumbly solid which was insoluble in carbon disulfide, acetone, ethanol, ether, ethyl acetate, chloroform, dioxane, paraffinic hydrocarbons, and monomeric allyl mannitol, and swelled in benzene.

EXAMPLE IX

Eight grams of triallyl glycerol were reacted with 7.63 grams of sulfur monochloride (enough for three allyl groups) by mixing the reactants with agitation while maintaining the temperature at about 25° C. Within half an hour the reaction mixture was converted to a hard, amber-like resinous solid that was insoluble in all common organic solvents.

EXAMPLE X

To ten grams of hexaallyl mannitol were added 1.60 grams of sulfur monochloride (enough for one allyl group per mannitol molecule) while maintaining the temperature of the mixture at 25° C. The exothermic reaction was completed after four hours. After standing overnight at room temperature, the product was a viscous liquid, soluble in benzene, carbon disulfide, acetone, ethanol, chloroform, dioxane, and allyl mannitol monomer; it formed a cloudy mixture with large amounts of paraffinic hydrocarbon solvents, and was insoluble in water. The molecular weight of this substance in benzene (cryoscopic) was 726.

EXAMPLE XI

Ten grams hexaallyl mannitol were reacted at 25° C. with 2.7 grams of sulfur monochloride (enough for 1.5 allyl groups). The product so obtained was an insoluble solid which swelled in benzene, carbon disulfide, acetone, ether, ethyl acetate, dioxane and allyl mannitol, but was completely insoluble in ethanol and paraffinic hydrocarbons.

EXAMPLE XII

Ten grams of hexaallyl mannitol were reacted at 25° C. with 3.19 grams sulfur monochloride (enough to react with two allyl groups). After stirring for one hour the liquid mixture was converted to a pale yellow powder. It was insoluble in acetone, ethanol, ethyl acetate, ether; swelled by benzene, xylene, chloroform, carbon tetrachloride, carbon disulfide, and dioxane. On a hot-stage melting point apparatus this product did not melt, but slow decomposition set in at 230° C. This product contains 13.5% sulfur and 13.6% chlorine.

EXAMPLE XIII

Ten grams of hexaallyl mannitol were reacted at 25° C. with 6.38 grams of sulfur monochloride (enough for 4 allyl groups). In thirty minutes the reaction mixture was converted into a dark brown resinous mass which was insoluble in organic solvents.

EXAMPLE XIV

The procedure of Example XIII was repeated, but the temperature of the reaction mixture was maintained at 0° C. A yellow, optically clear, tough glass-like material of strong adhesion to the glass vessel was formed. This product was insoluble in benzene and acetone.

EXAMPLE XV

A mixture of ten grams hexaallyl mannitol and 6.38 grams sulfur monochloride were placed in a large test tube; and a smaller test tube, through which ice water flowed was set inside the first test tube so as to provide a cool inner surface in contact with the reaction mixture. The larger test tube was placed in an ice water bath. After twenty-four hours the reaction mixture solidified to a hard, brilliantly clear, yellow resin which adhered tenaciously to the glass walls of the vessels. When the glass was broken and separated with difficulty from the polymer, a hard, bright surface was exposed which resisted attack by laboratory air or water.

EXAMPLE XVI

Ten grams of tetraallyl pentaerythritol treated with 9.13 grams of sulfur monochloride (enough for four allyl groups) at 0° C. gave a tough, fairly hard, pale yellow solid which was infusible and insoluble in all common organic solvents.

EXAMPLE XVII

Ten grams of hexaallyl dipentaerythritol treated with 5.46 grams of sulfur monochloride (enough for four allyl groups) at 0° C. yielded a product similar to that of Example XVI.

EXAMPLE XVIII 2.32 grams of sulfur monochloride dissolved in 5 ml. of toluene were added at room temperature to 20 grams of a 25% solution of allyl starch in toluene with swirling to prevent local precipitation. The flask containing the mixture was then stoppered and placed in an ice water bath. The mixture solidified after fifteen minutes. After allowing the flask to stand overnight in a cold room, the stopper was removed and the toluene evaporated spontaneously at room temperature. The solid residue was easily broken; it was insoluble in benzene and acetone.

EXAMPLE XIX

Allyl starch, containing about two allyl groups per glucose unit, was dissolved in benzene to form a solution containing 16 parts of allyl starch per 100 units of solution. Wooden panels were given two brushed-on coats of this benzene solution of allyl starch, and after the panels became dry to the touch (evaporation of the solvent), they were placed in a desiccator containing a dish of sulfur chloride. After about 5 hours at room temperature, the panels were removed from the desiccator. On rubbing the film with acetone-soaked cloth, it showed no solubility in acetone.

EXAMPLE XX

To a solution of allyl starch containing about two allyl groups per glucose unit, in benzene, a benzene solution of sulfur monochloride was added to give a solution containing sulfur monochloride and allyl starch in the approximate ratio of 8:5. Wooden panels coated with this solution were air-dried at room temperature, and after about 3½ hours, the coat was found to be insoluble in acetone.

EXAMPLE XXI

Coats on wooden panels prepared as in Example XX became insoluble in about 10 minutes after drying in a forced-draft oven at 80° C.

EXAMPLE XXII

One coat of allyl sucrose (about 45% allyl or 7 allyl groups), was applied to panels which were subsequently kept in a desiccator containing a dish of sulfur monochloride. After about 7 hours at room temperature, the coating was insoluble in acetone, whereas the control, kept for the same time, was still wet to the touch.

EXAMPLE XXIII

Wooden panels were coated with methallyl mannitol (about 63% methallyl or 5.5 methallyl groups), and exposed to vapors of sulfur chloride in the manner described in Example XIX. After 5 hours' exposure at room temperature, the coat was insoluble in acetone.

Quantitative experiments on the insolubilization of allyl starch films yielded the following results, in which Table I indicates the results obtained using sulfur monochloride ($S_2Cl_2$), and Table II illustrates the results obtained using sulfur dichloride vapor ($SCl_2$):

*Table I*

| Ratio of mols of sulfur monochloride ($S_2Cl_2$) to mols of diallyl starch | Percent insoluble material after— | |
|---|---|---|
| | 3 hours | 6 hours |
| 0:5 | 25 | 27 |
| 1:5 | 95 | 95 |
| 3:5 | 96 | 97 |
| 5:5 | 99 | 99 |

*Table II*

| Time of exposure, Min. | Percent insoluble material |
|---|---|
| 15 | 35 |
| 30 | 50 |
| 60 | 68 |
| 120 | 97 |
| 180 | 99 |

We claim:

1. A process comprising reacting a solvent soluble allyl ether containing a plurality of allyl ether groups and in bulk form with a sulfur chloride by forming a mixture of said reactants wherein the molar ratio of the sulfur chloride to the ether is at least 1 to 2, and allowing the reaction to proceed to substantial completion at a temperature of about from 0° to 25° C.

2. The process of claim 1 wherein the sulfur chloride is sulfur monochloride.

3. A process comprising reacting a solvent soluble aliphatic allylic ether containing a plurality of allylic ether groups and selected from the group consisting of allyl starch and allyl sucrose with a sulfur chloride and allowing the reaction to proceed to substantial completion at a temperature below about 40° C.

4. A process comprising reacting a solvent soluble allyl ether of starch containing a plurality of allylic ether groups with a sulfur chloride and allowing the reaction to proceed to substantial completion at a temperature below about 40° C.

5. A process comprising reacting a solvent soluble allyl ether of sucrose containing a plurality of allylic ether groups with a sulfur chloride and allowing the reaction to proceed to substantial completion at a temperature below about 40° C.

6. A process comprising reacting a solvent soluble allyl ether containing a plurality of allyl ether groups, in bulk form, and selected from the group consisting of allyl starch and allyl sucrose with a sulfur chloride by forming a mixture of said reactants wherein the molar ratio of the sulfur chloride to the ether is at least 1 to 2, and allowing the reaction to proceed to substantial completion at a temperature below about 40° C.

7. A process comprising reacting solvent soluble allyl starch containing a plurality of allyl ether groups and in bulk form with a sulfur chloride by forming a mixture of said reactants wherein the molar ratio of the sulfur chloride to the ether is at least 1 to 2, and allowing the reaction to proceed to substantial completion at a temperature below about 40° C.

8. A process comprising reacting solvent soluble allyl sucrose containing a plurality of allyl ether groups and in bulk form with a sulfur chloride by forming a mixture of said reactants wherein the molar ratio of the sulfur chloride to the ether is at least 1 to 2, and allowing the reaction to proceed to substantial completion at a temperature below about 40° C.

ARTHUR N. WRIGLEY.
ELIAS YANOVSKY.
PETER L. NICHOLS, Jr.

REFERENCES CITED

The following references are of record in the file of this patent:

UNITED STATES PATENTS

| Number | Name | Date |
|---|---|---|
| 1,955,068 | Hopff et al. | Apr. 17, 1934 |
| 2,414,144 | Ernsberger | Jan. 14, 1947 |
| 2,449,816 | Nichols et al. | Sept. 21, 1948 |

OTHER REFERENCES

Nichols et al., Ind. & Eng. Chem., Feb. 1945, pp. 201–202.

Nichols et al., Official Digest, Mar. 1945, pp. 111–123.